United States Patent Office 2,938,062
Patented May 24, 1960

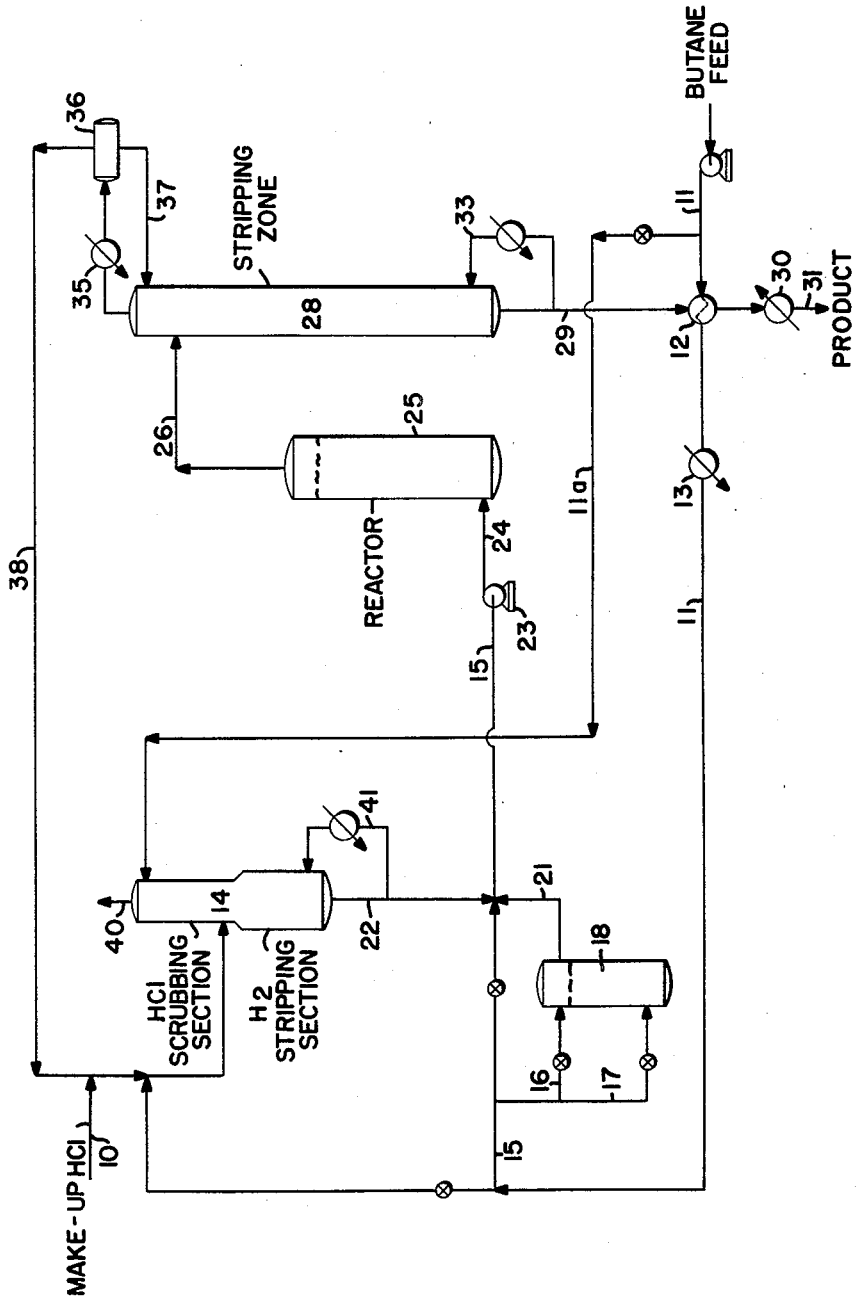

2,938,062

LIQUID PHASE BUTANE ISOMERIZATION PROCESS

Stephen F. Perry, Westfield, N.J., assignor to Esso Research and Engineering Company, a corporation of Delaware Filed July 10, 1958, Ser. No. 747,682

8 Claims. (Cl. 260—683.75)

The present invention concerns an improved method for the isomerization of butane in the liquid phase wherein good selectivity to isobutane is obtained with a high conversion per pass and with complete absence of sludge formation.

It is well known to subject straight chain paraffin hydrocarbons obtained from the refining of petroleum to isomerization reactions that convert those hydrocarbons to branched chain isomers. The highly branched isomers have greater octane ratings than the corresponding straight chain or slightly branched chain hydrocarbons. In the case of normal butane, conversion to the isomer is desirable because isobutane is much more reactive than normal butane for various synthesis processes. For example, there is considerable demand for isobutane for use in alkylation reactions with olefins, such as butenes and pentenes, for the manufacture of high octane aviation gasoline and motor fuels.

For effecting the isomerization of normal paraffin hydrocarbons, the aluminum halides, such as aluminum chloride and aluminum bromide, have been found to be very useful catalysts. Usually the catalysts are associated with suitable supports and are used in conjunction with certain promoters, such as hydrogen chloride, hydrogen bromide, boron fluoride and the like. Heretofore both liquid phase and vapor phase operations have been employed for butane isomerization. It has now been found that superior results are obtained, with high conversions and high selectivities to isobutane, if the butane isomerization is conducted in the liquid phase in the presence of supported aluminum halides and hydrogen halide promoters and if positive steps are taken to ensure essentially complete removal of hydrogen from the reaction zone.

It has been previously taught in the art that the presence of hydrogen is desirable to suppress side reactions when isomerizing normal paraffin hydrocarbons. Hydrogen is formed in trace amounts as a by-product both in liquid phase and vapor phase isomerization. In the commercial isomerization of butane as previously practiced, wherein hydrogen halides are stripped from the isomerization product and recycled, and by-product light gases are vented through a vent gas scrubber, countercurrent to a liquid butane stream to prevent excessive loss of hydrogen halides, a buildup of as much as 0.5 mol percent of hydrogen, based on feed, may occur. This amount of hydrogen has no appreciable effect on the vapor phase butane isomerization process. It has now been found, however, that if a liquid phase process is employed, a hydrogen buildup to more than 0.1 mol percent, based on feed, seriously affects the percent conversion. Thus, it is a principal object of the present invention to provide means for effectively removing hydrogen from the hydrogen halide recycle almost completely so that no appreciable suppression of the reaction will occur.

In accordance with the present invention, a hydrogen buildup in the reaction system is prevented by subjecting the hydrogen halide recycle stream to an intensive and efficient fractionation.

The essential features of the process of this invention will be understood when reference is made to the accompanying drawing in which the single figure is a diagrammatic flow plan of a liquid phase butane isomerization process employing the principles of this invention.

The process will be described with particular reference to the use of aluminum chloride catalyst and HCl as the promoter, although the invention is not limited thereto. Referring now to the drawing in detail, a suitable butane feed stream is conducted by means of line 11 through heat exchangers 12 and 13, is combined with the HCl recycle from line 38 and dissolves at least a major part of this recycle stream. The combined stream then enters recycle gas fractionator 14, the functioning of which will be explained later. A minor proportion of the feed stream is diverted through line 15. Portions of the diverted stream are sent by means of lines 16 and 17 through an aluminum halide saturator wherein aluminum halide for the process is picked up to be carried into the reactor. The portion of the stream flowing through line 17 passes through a bed of aluminum chloride, for example, and is saturated with the halide. To prevent precipitation of the aluminum halide in the lines, this saturated stream is immediately diluted with another portion of the diverted stream passing through line 16 so that the combined streams leaving the saturator through line 21 are less than fully saturated with aluminum halide. The remainder of the diverted stream in line 15 and the feed stream leaving the recycle gas fractionator 14 through line 22 are combined with the aluminum-halide-containing stream in line 21 and sent by means of pump 23 and line 24 into the reactor 25.

Reactor 25 contains one or more beds of supported aluminum halide and the conditions in the reactor are such as to effect the desired isomerization. The isomerization product leaves the reactor through line 26 and is sent directly to a hydrogen halide stripping zone 28 wherein separation of the hydrogen halide from the isomerization product is effected. To aid in the separation, a reboiler line 33 is provided at the base of the stripper. The stripped product leaves through line 29 and is cooled in heat exchangers 12 and 30 before leaving the system through line 31.

The overhead stream from the hydrogen halide stripper passes through condenser 35 and knock-out drum 36 to condense out and remove the major portion of the butane product that is entrained in the exit gas stream. The condensed butane returns to the stripping zone through reflux line 37. The hydrogen halide recycle is then conducted by means of line 38 to combine with the major butane feed stream, as described previously, and then enters the recycle gas fractionator 14.

The bulk of the hydrogen halide in the recycle stream and a substantial part of the light gases (hydrogen and methane) contained in the recycle stream dissolve in the butane feed before entering the recycle gas fractionator. In the upper part of this tower above the feed plate, denoted as the HCl scrubbing section, the ascending vapors are scrubbed with cold liquid butane entering via line 11a to permit venting hydrogen and methane without excessive loss of HCl. The scrubbed gas is vented through line 40. It will be readily apparent that if only the upper section of the tower, which corresponds to a conventional vent gas scrubber, were in operation, a considerable amount of hydrogen would accumulate in the system before the rate of hydrogen removal would equilibrate with its rate of formation in the reactor. This accumulation has been observed in previous commercial plant operation, where recycling of about 0.4 mol percent hydrogen and 2.0 mol percent methane to the reactor, based on feed, is typical of normal operation, even though the rate of formation of these compounds is only about 0.05 to 0.10 mol percent, based on feed.

In accordance with this invention, the bottoms from the recycle gas fractionator are reboiled and the section of the tower below the feed plate, denoted in the drawing as the $H_2$ stripping section, is used to strip out dissolved hydrogen and methane. It is desired to reduce the dissolved hydrogen content, and therefore the amount of hydrogen recycled to the reaction zone, to below 0.1 mol percent and preferably, to less than 0.02 mol percent based on the butane entering the reaction zone. This can be done, for example, with five theoretical plates in the stripping section, when vaporizing about 2 mol percent, based on feed, in the reboiler. For heat balance, the butane stream introduced at the top of the tower will amount to about 4 mol percent of the total $C_4$ feed when its temperature is 100° F., the main feed stream to the tower is substantially at its bubble point and the reboiler is operated at 200° F. These conditions are given merely as examples but are typical of the operation when using supported $AlCl_3$ catalyst.

As a more general example, about 70 to 80 percent of the butane feed to the reactor will pass through the recycle gas fractionator via line 11, about 4 to 8% will flow via line 11a into the hydrogen halide scrubbing section and the remainder will enter the reactor via lines 15, 16 and 17.

Suitably, the lower hydrogen stripping section of the recycle gas fractionator 14 is of larger diameter than the upper hydrogen halide scrubbing section, as shown, because of the larger volume of liquid to be handled in the lower section. The tower may contain packing, jet trays or other suitable contacting means.

While there are practical advantages for locating the "recycle gas fractionator" upstream of the reactor, as shown in the drawing, it would be possible to accomplish the same result by locating it between the reactor and the HCl stripper, and such an operation is considered within the scope of this invention.

As stated previously, both aluminum chloride and aluminum bromide may be employed as catalysts for the isomerization reaction of this invention. Also, it is preferred that the halide be associated with a suitable support. Such supports include alumina, silica, bauxite or the like. A particularly desirable support material is a partially dehydrated calcined bauxite marketed commercially as Porocel. The dehydration of the bauxite is carried out to a point where substantially no water may be given off during the isomerization reaction. A suitable pretreatment of the bauxite would be to heat the same for from 5 to 15 hours at 900° to 1000° F. or for 1 to 3 hours at 1100° to 1200° F.

The preferred startup procedure when using $AlCl_3$ on bauxite (Porocel) as the catalyst and HCl as catalyst promoter, is as follows. After charging the dehydrated bauxite to the reactors, the temperature is brought up above the desired reaction temperature (in practice, to the maximum temperature obtainable in the equipment) by purging with hot butane vapors. This also serves to remove any loosely held moisture picked up by the bauxite by exposure to the atmosphere subsequent to the initial dehydration. The butane purge rate is then reduced and anhydrous HCl is injected along with the butane until HCl is detected in the reactor effluent. The HCl is completely retained by the bauxite to the extent of about 60 to 80 pounds per ton of bauxite. Some of this is consumed by reaction with iron oxide and other minor constituents that may be present in the bauxite and some is physically adsorbed. Additional moisture is released during the HCl pretreating step, so the butane purge is continued after the HCl treatment until the water content of the effluent falls below a specified level, for example, 0.05 wt. percent on butane. At this point, the temperature of the incoming butane is dropped to that desired for liquid phase operation and the reactor pressure is allowed to rise until the reactor fills with liquid butane. Aluminum chloride is then introduced into the reactor by initially sending all of the feed through the aluminum halide saturator 18 until sufficient aluminum chloride to saturate a substantial part of the Porocel has been added to the reactor. The proportion of the feed passing through the aluminum chloride pickup drum is then reduced to within the range of about 1 to 5% for normal operation. Saturation of this small proportion of the feed with aluminum chloride is usually all that is needed to maintain catalyst activity, by replacing, on the Porocel, the small quantities of $AlCl_3$ that are used up by reaction with feed stock impurities (mainly water) or that are lost from the system. After the step of impregnating the catalyst support with aluminum chloride has been completed, anhydrous HCl is introduced into the system through HCl addition line 10. As soon as the HCl inventory in the system permits, HCl recycle is established.

When aluminum chloride catalyst and hydrogen chloride promoter are employed, the process conditions include pressures in the range of 250 to 500 p.s.i.g., temperatures of 100° to 250° F., HCl concentrations of from 1 to 10 mol percent based on the feed and feed rates of from 0.2 to 2.0 liquid v./v./hr. based on the volume of catalyst support. Particularly preferred conditions are temperatures of 180 to 230° F., pressures of 280 to 340 p.s.i.g., feed rates of 0.5 to 1 v./v./hr. and hydrogen chloride concentrations of 2 to 5 mol percent. Preferably, the Porocel support is in the size range of 10 to 30 mesh. With aluminum bromide catalyst and HBr promoter a somewhat lower temperature range may be used, e.g., 50° to 150° F., with pressures correspondingly lower but sufficient to keep the butanes in the liquid phase. The necessary pressure is also somewhat dependent on the amount of hydrogen halide needed in the reaction.

A representative feed stream for the process may comprise a mixture of 94.5% normal butane, about 5% isobutane, no propane, not more than 0.5% pentane. It is desirable that the feed be treated to remove olefins, such as butylenes, to less than 0.01 liquid volume percent, and dried as completely as possible, preferably to a water content of less than 10 p.p.m. by weight.

Field normal butane, normal butane fractionated from crude petroleum, and butane recovered by fractionating the effluent from butenes alkylation require no treatment for olefin removal, provided that they have been carefully segregated from any olefin-containing streams. Other refinery butane streams, such as the $C_4$ from catalytic reforming, the spent butane from $C_3/C_4$ polymerization, and $C_4$ from thermal or catalytic cracking operations after the extraction of butadiene and butenes for chemical uses, contain from 0.1 to 10% of olefins or more, usually from 0.2 to 2%. Several methods are available for removing these olefins from isomerization feed stock. One well known type of treatment is with polymerization or alkylation catalysts, such as sulfuric or phosphoric acids or the aluminum halides. The olefins are converted to polymers or alkylates, which must then be removed by fractionation since these compounds are also harmful in the isomerization step. A second type of treatment which may be used is catalytic hydrogenation to convert the olefins to paraffins. It would, of course, be necessary to remove excess hydrogen from the feed completely, for use of this pretreatment method in the present process.

Pilot unit studies on the effect of hydrogen on the conversion level in liquid phase butane isomerization have established that as much as 10% isobutane conversion is lost for each 0.1 mol percent of hydrogen in the feed. Hence, it is extremely important that essentially all of the hydrogen be removed from the material entering the reaction zone in order that maximum conversion of butane to isobutane may be obtained. Conversion level is a major factor in the economics of the process, because higher conversion not only increases the production of isobutane for a given isomerization plant size but also substantially reduces the cost of subsequent fractionation to make the desired isobutane concentrate.

*Example*

For further illustration, the conditions and results of a commercial test carried out according to the teachings of the present invention are summarized below:

| | |
|---|---|
| Porocel charge [1] | 46,000 lbs. |
| $AlCl_3$: | |
|     Total charged [2] | 12.2 wt. percent based on Porocel. |
|     Estimated makeup rate req'd to maintain constant activity | Less than 0.05 wt. percent based on feed. |
| Feed Rate: | |
|     B./hr | 80. |
|     v./v./hr | 0.54. |
| HCl rate | 2–3 mol percent based on feed. |
| Temperature, °F.: | |
|     Inlet | 195. |
|     Outlet | 220. |
| Pressure, p.s.i.g. | 320. |
| Reaction products—mol percent based on feed: | |
|     Isobutane | 55–60. |
|     Hydrogen | 0.06–0.09. |
|     $C_1$ | 0.06–0.09. |
|     $C_3$ | 1.0–1.4. |
|     $C_5$ | 1.5–2.0. |

[1] 10–30 mesh, low volatile matter, low iron content grade purchased from the Mineral & Chemicals Corp. of America.
[2] Includes initial impregnation and eight days' makeup.

The remainder of the product was unreacted normal butane. The amount of hydrogen recycled in this operation was in the range of 0.03 to 0.06 mol percent on feed. With previously accepted plant procedures, including the use of a conventional vent gas scrubber, at least 0.2 mol percent of hydrogen was found to dissolve in the feed and to be recycled to the reactor, and less than 40% conversion to isobutane per pass was obtained, under otherwise similar conditions.

A particularly desirable feature of the liquid phase process, as practiced in this invention, is the complete freedom from sludge formation. In all other known liquid phase processes, at least some sludge is formed. The resultant practical difficulties (corrosion, plugging, excessive catalyst consumption) are well known. Sludge formation is avoided in the present invention by preventing the concomitant presence of butane, HCl and solid aluminum chloride in bulk form at isomerization temperatures. Sludge formation does not occur if HCl is kept out of the pickup drum or saturator 18 or if the aluminum chloride is completely dissolved or if the aluminum chloride is adsorbed on the Porocel support. Thus there is no formation of sludge if care is taken to avoid the deposition of solid $AlCl_3$ in the lines between the pickup drum and the reactor. Since the solubility of aluminum chloride in hydrocarbons declines rapidly with temperature, the possibility of precipitating solid aluminum chloride in the lines from the saturator or pickup drum to the reactor is avoided by diluting the stream of butane and aluminum chloride from the bed in saturator 18 with butane from line 16, preferably to less than 50 percent $AlCl_3$ saturation. Precipitation of $AlCl_3$ is also prevented by avoiding any substantial drop in temperature of the stream passing through line 21, the terminal portion of line 15, and line 24 to the reactor.

It is not intended that this invention be limited by the specific illustrations thereof presented herein by way of example. The scope of the invention is defined by the appended claims.

What is claimed is:

1. In a liquid phase process wherein butane is isomerized to isobutane in a reaction zone in the presence of an aluminum halide and a hydrogen halide promoter at temperatures in the range of about 50° to 250° F. and wherein hydrogen halide is recovered and recycled to the reaction, the improvement which comprises removing hydrogen from the recycled hydrogen halide to the extent required to reduce the amount of hydrogen recycled to the reaction zone to less than 0.1 mol percent based on the butane entering the reaction zone.

2. Process as defined by claim 1 wherein the catalyst comprises aluminum chloride and the promoter comprises hydrogen chloride.

3. In a liquid phase process wherein butane is isomerized to isobutane in a reaction zone in the presence of an aluminum halide and a hydrogen halide at temperatures in the range of about 50° to about 250° F. and wherein hydrogen halide is recovered and recycled to the reaction zone, the improvement which comprises subjecting the hydrogen halide recycle stream to an intensive and efficient fractionation whereby the amount of hydrogen recycled to the reaction zone is reduced to less than 0.1 mol percent, base on the butane entering the reaction zone.

4. Process as defined by claim 3 wherein said fractionation is effected by mixing the recycle stream with a portion of the butane feed to the reaction zone, conducting the mixture to a mid-portion of a fractionation zone, wherein hydrogen vapors and hydrogen halide vapors ascend from said mixture and butane containing dissolved hydrogen and hydrogen halide descends from said mixture, contacting said ascending vapors with cold butane feed entering a top portion of said fractionation zone, removing hydrogen from the top of said fractionation zone, reboiling butane in the lower portion of said fractionation zone and removing butane and dissolved hydrogen halide from the bottom of said fractionation zone.

5. Process as defined by claim 1 wherein the catalyst comprises aluminum chloride adsorbed on a support, the promoter is anhydrous chloride, and aluminum chloride is added to the reaction zone by solution in a portion of the butane feed, and wherein complete freedom from sludge formation is attained by preventing the concomitant presence of butane, hydrogen chloride and solid aluminum chloride in bulk form.

6. Process as defined by claim 1 wherein said hydrogen content is reduced to a value not exceeding about 0.06 mol percent, based on the butane feed.

7. Process as defined by claim 3 wherein said aluminum halide comprises aluminum chloride adsorbed on a support.

8. Process as defined by claim 3 wherein said aluminum halide comprises aluminum chloride adsorbed on calcined bauxite.

References Cited in the file of this patent

UNITED STATES PATENTS

| | | |
|---|---|---|
| 2,271,043 | Van Peski | Jan. 27, 1942 |
| 2,392,284 | Gage | Jan. 1, 1946 |
| 2,397,769 | Wadley | Apr. 2, 1946 |
| 2,407,488 | Franklin | Sept. 10, 1946 |
| 2,433,482 | Roberts | Dec. 30, 1947 |